United States Patent [19]

Otani et al.

[11] 4,134,871

[45] Jan. 16, 1979

[54] METHOD FOR REDUCING THE ADHESIVENESS OF HYDROGEL-LIKE POLYMER BY ADDING POLYETHYLENE GLYCOL

[75] Inventors: Hisao Otani; Akihisa Furuno; Iwao Ohshima, all of Yokohama, Japan

[73] Assignees: Nitto Chemical Industry Co., Ltd.; Mitsubishi Rayon Co., Ltd., both of Tokyo, Japan

[21] Appl. No.: 758,275

[22] Filed: Jan. 10, 1977

[30] Foreign Application Priority Data

Jan. 9, 1976 [JP] Japan ................................ 51-1599
Dec. 17, 1976 [JP] Japan ............................ 51-150847

[51] Int. Cl.² ........................................... C08L 33/26
[52] U.S. Cl. ............................................. 260/29.6 H
[58] Field of Search .................................. 260/29.6 H

[56] References Cited

U.S. PATENT DOCUMENTS

| | | | |
|---|---|---|---|
| 3,278,506 | 10/1966 | Chamot et al. | 260/29.6 H |
| 3,352,806 | 11/1967 | Hicks | 260/29.6 H |
| 3,402,137 | 9/1968 | Fischer et al. | 260/29.6 H |
| 3,515,575 | 6/1970 | Arnold | 260/29.6 H |

Primary Examiner—Howard E. Schain
Attorney, Agent, or Firm—Sughrue, Rothwell, Mion, Zinn and Macpeak

[57] ABSTRACT

A method of reducing the adhesiveness of a water-soluble hydrogel-like polymer obtainable by aqueous solution polymerization of acrylamide or a monomeric mixture consisting mainly of acrylamide in a high monomer concentraton using polyethylene glycol. Where the hydrogel-like polymer has already been formed, the adhesiveness of the polymer can be reduced by merely applying polyethylene glycol to the surface of the polymer. Where it is desired to obtain a hydrogel-like polymer whose adhesiveness has been reduced, a very simple method of performing the polymerization in the presence of polyethylene glycol can be used to achieve the desired objective.

13 Claims, No Drawings

METHOD FOR REDUCING THE ADHESIVENESS OF HYDROGEL-LIKE POLYMER BY ADDING POLYETHYLENE GLYCOL

BACKGROUND OF THE INVENTION

1. Field of the Invention

This invention relates to a method for reducing the adhesiveness of a water-soluble acrylamide-type polymer, and more specifically, provides a hydrogel of a water-soluble acrylamide-type polymer whose adhesiveness during drying to a pulverizable state is reduced so as to permit handling with good efficiency.

2. Description of the Prior Art

Water-soluble polymers such as polyacrylamide, a partially hydrolyzed product of polyacrylamide, and cationic, anionic or or nonionic copolymers containing acrylamide (to be generically referred to hereinbelow as acrylamide-type polymers) have recently gained increasing acceptance as paper strengthening agents, thickeners for use in paper-making and flocculating agents for treating water.

Various methods of polymerization, e.g., as described in Encyclopedia of Polymer Science and Technology, Vol. 1, (John Wiley and Sons, Inc. (1964)) and more specifically, methods such as aqueous solution polymerization (e.g., as described in U.S. Pat. No. 3,332,922), emulsion polymerization (e.g., as described in U.S. Pat. No. 3,284,393), suspension polymerization (e.g., as described in U.S. Pat. No. 2,982,749), radiation polymerization (e.g., as described in U.S. Pat. No. 3,477,932) or precipitation polymerization are known to prepare acrylamide-type polymers, but the aqueous solution polymerization method has been most widely used because it is economical and easily affords high-molecular weight polymers. From the stand point of economy in polymerization, transportation or drying, it is desirable to start the polymerization with a high monomer concentration.

As the concentration of the monomer increases, however, the resulting polymer becomes an elastomeric gel having a higher viscosity, and is difficult to handle as a fluid. A possible method for avoiding this difficulty would be one which comprises mincing such a high-viscosity elastomeric gel into coarse gel-particles, drying the particles using a rotary cylindrical dryer, a belt-type dryer or the like, and then finely pulverizing the dried particles thereby to produce a readily water-soluble powdery polymer that is easy to handle. This method, however, has the disadvantage that because of the adhesiveness of the polymeric gel, its adhesion to other substances or to itself becomes exceedingly high, and this is a great drawback in drying the polymeric hydrogel.

In order to solve this problem, U.S. Pat. No. 3,905,122 discloses a method which comprises extruding a high-viscosity elastomeric gel through a perforated plate, forming mutually adhering small gel globules by cutting the gel before or after passing the gel through the perforated plate, and drying the aggregate with hot air while applying a shearing force. This method is successful to some extent, and hydrogels of anionic or nonionic polymers can be treated relatively well with this method. Since, however, hydrogels of cationic polymers generally have a much higher adhesiveness than anionic or nonionic polymers, a reduction in the adhesion of the polymeric hydrogel particles to one another still cannot be achieved, and a good drying operation is difficult to perform.

SUMMARY OF THE INVENTION

Extensive investigations have been made in order to reduce the adhesiveness of cationic acrylamide copolymer gels and overcome the disadvantages of the method disclosed in the above-cited U.S. Pat. No. 3,905,122.

Consequently it has now been found that polyethylene glycol added during the production of an acrylamide-type polymer or to the resulting hydrogel-like acrylamide-type polymer markedly reduces the adhesiveness of water-soluble cationic acrylamide-type polymers, and such polymers can be minced and dried without hardly any adhesion between the gel particles.

It has also been discovered that when this technique is applied to the production of anionic or nonionic acrylamide polymers or copolymers, the adhesiveness of these types of polymeric gels is further reduced as compared with that obtained with conventional treatments of anionic or nonionic polymeric gels, as would naturally be expected, and operability in pulverizing and drying such polymeric gels is also enhanced, thus substantially avoiding a partial agglomeration of the polymeric gel particles within the dryer due to their adhesiveness which has been observed frequently in conventional techniques.

The present invention is based on the above findings, and provides a method for reducing the adhesiveness of a hydrogel-like water-soluble acrylamide polymer or copolymer which comprises subjecting an aqueous solution of acrylamide or a monomeric mixture consisting mainly of acrylamide in high concentration to aqueous solution polymerization in the presence of polyethylene glycol.

In another aspect of this invention, the invention provides a method for reducing the adhesiveness of a hydrogel-like water-soluble acrylamide polymer or copolymer which comprises coating polyethylene glycol on the surface of the polymeric hydrogel using means such as spraying.

DETAILED DESCRIPTION OF THE INVENTION

The acrylamide-type polymer to which this invention is applicable must be substantially elastic, and have some degree of rigidity. If the concentration of the starting monomer is too low at the time of polymerization, the resulting polymeric gel becomes soft and difficult to treat. For example, when an acrylamide polymer having an average molecular weight of about 8 million is desired, the lower limit of the concentration of the starting monomer is about 18% by weight.

Examples of the acrylamide-type polymers to which this invention is applicable are polyacrylamide, a partially hydrolyzed product of polyacrylamide, and water-soluble copolymers of acrylamide with other vinyl monomers as comonomers. Examples of vinyl comonomers which can be used to prepare these acrylamide copolymers include cationic vinyl monomers such as dimethylaminoethyl acrylate, dimethylaminoethyl methacrylate, diethylaminoethyl acrylate, diethylaminoethyl methacrylate, dimethylaminohydroxypropyl acrylate, dimethylaminohydroxypropyl methacrylate, or dimethylaminoethyl acrylamide; quaternary ammonium salts of cationic vinyl monomers obtained by treatment with quaternizing agents, e.g., alkyl halides such as methyl chloride, methyl iodide, methyl bromide, etc.; dialkyl sulfates such as dimethyl sulfate, diethyl sulfate, etc.; nonionic monomers such as acrylonitrile, methacrylonitrile, methyl acrylate, ethyl acrylate or methacrylamide; anionic monomers such as acrylic acid, methacrylic acid, or salts of these e.g., alkali metal salts or ammonium salts.

A suitable molecular weight for the acrylamide-type polymers to which this invention is applicable is at least about 1,000,000, preferably about 2,000,000. In the case of a cationic polymer, pendant groups are present and, therefore, an acrylamide-type polymer having a molecular weight slightly lower than that of a nonionic or an anionic polymer can be employed. Where a cationic monomer is used to produce the acrylamide-type polymer, the comonomer can be used in an amount of up to about 50% by weight to the total weight of acrylamide and the comonomer. However, where an anionic monomer is used, it is preferred to use less than about 50% by weight. Specifically, on considering the solubility of the final polymer product, for certain kinds of monomer the upper limit for the comonomer used is the maximum solubility which the comonomer itself possesses.

With respect to the aqueous solution polymerization, suitable process conditions which can be used to produce the acrylamide-type polymers used in this invention can be easily selected by one skilled in the art. As an example, a 23% aqueous solution of a monomer mixture comprising 95% by weight of the total monomer of acrylamide and 5% by weight of the total monomer of dimethylaminoethyl methacrylate is subjected to an adiabatic polymerization at a polymerization initiation temperature of about 25 to about 28° C. using 2,2'-azobis-2-amidinopropane hydrochloride as a polymerization initiator. After about 2-3 hours, the polymerization temperature reaches the maximum (about 95° C.) with the polymerization being completed and a raw rubber-like and adhesive polymer hydrogel is obtained. In general a monomer concentration in the aqueous solution is a concentration of at least about 18% by weight.

The polyethylene glycol used as an additive in the method of the present invention has an average molecular weight of about 300 to 1,000,000, preferably about 1,000 to 20,000. When polyethylene glycol having an average molecular weight of about 300 to 1,000 is employed, a reduction in adhesiveness to some extent can be obtained. However, the reduction effect in adhesiveness is best exhibited when the polyethylene glycol has an average molecular weight of about 1,000 to 20,000. On the other hand, when polyethylene glycol (including polyethylene oxides in a broad sense) having a very high molecular weight (e.g., an average molecular weight of about 1,000,000 or higher) is used, the effect of reducing the adhesiveness was substantially the same as in the case of using a polyethylene glycol having an average molecular weight of not more than 1,000. It was found however that when this very high-molecular-weight polyethylene glycol was used during the polymerization, the viscosity of the monomer solution increased because the polyethylene glycol was dissolved in the solution prior to polymerization, and this adversely affected the polymerization operation.

When polyethylene glycol is used during the polymerization of an acrylamide-type monomer in accordance with the present invention, the polyethylene glycol only needs to be dissolved in the aqueous solution of the monomer in the required amount. When the polyethylene glycol is to be applied directly to the hydrogel-like polymer, a fine powder of the polyethylene glycol may be applied to the polymer since polyethylene glycol having the above-specified molecular weight has the form of flakes at room temperature (about 20-30° C.). If desired, an aqueous solution of the polyethylene glycol may be first formed and the solution then sprayed onto the polymer.

An aqueous solution of polyethylene glycol is not compatible with the hydrogel-like polymer, and with the passage of time, the polyethylene glycol tends to deposit on the surface of the polymer. Hence, even if polyethylene glycol is incorporated into the hydrogel-like polymer, the polyethylene glycol gradually gathers on the surface of the polymer to coat the surface sufficiently.

A suitable amount of the polyethylene glycol which is used is about 0.05 to about 10%, preferably 0.1 to 5%, by weight based on the monomer solution or the polymeric hydrogel.

The amount of the polyethylene glycol added will vary slightly depending upon the period in time at which the addition is made more specifically. When the polyethylene glycol is added to the polymerization system prior to the polymerization, the amount added is about 0.1 to about 10% by weight, but when the polyethylene glycol is applied, e.g., by spraying, onto the polymeric hydrogel, a sufficient effect can be achieved using an even smaller amount, e.g., not more than about 0.05% by weight. The reason a smaller amount can be used in unknown, but it is assumed to be that it is unnecessary to actually incorporate the polyethylene into the interior of the hydrogel.

For anionic polymers, nonionic polymers, or weakly cationic polymers containing less than about 20% by weight of cationic monomer units, the effect achieved with the polyethylene glycol is sufficiently exhibited even when the polyethylene glycol is employed in an amount of as low as about 0.05 to 0.2% by weight based on the monomer solution or the hydrogel. On the other hand, medium to strongly cationic copolymers containing a higher ratio of cationic monomer units have increased adhesiveness, and therefore, small amounts of polyethylene glycol are not sufficient to reduce the adhesiveness of these types of polymers and the remaining adhesiveness is detrimental in subsequent handling of the polymer. Addition of polyethylene glycol in an amount of 0.5 to 5% by weight based on the monomer solution or the hydrogel reduces the adhesiveness of such polymeric hydrogels to an extent such that the hydrogel can be minced and dried satisfactorily.

Accordingly, the amount of polyethylene glycol which is suitable will be dependent on the composition of the acrylamide-type polymer and can be easily determined by one skilled in the art taking this into consideration.

It should be noted on the other hand that excessive amounts of polyethylene glycol not only reduce the quality of the polymer, but also foaming tends to occur when the polymer is dissolved in water.

The water-soluble hydrogel-like acrylamide-type polymer whose adhesiveness has been reduced in this manner can be formed into a dry powder by, for example, the method disclosed in U.S. Pat. No. 3,905,122 cited hereinabove. Even when the polymer is transported and stored in the form of small hydrogel globules, the globules do not adhere to one another, and therefore can be formed into an aqueous solution at the desired use location.

As described hereinabove, the present invention provides a very effective method for improving the handling of a wide range of acrylamide-type polmer gels including cationic, nonionic or anionic acrylamide polymers or copolymers, and partially hydrolyzed products of polyacrylamide.

The following Examples are given to illustrate the present invention in greater detail. It should be understood that the invention is not to be construed as being limited to these Examples. Unless otherwise indicated herein, all parts, percents, ratios and the like are by weight.

EXAMPLE 1

17.5 kg of acrylamide, 0.92 kg of dimethylaminoethyl methacrylate, 300 g of 96% sulfuric acid and 160 g of polyethylene glycol having an average molecular weight of 6250 were uniformly dissolved in deionized water in a 100-liter polymerization vessel whose interior was made of stainless steel, to form 80 kg of a monomer solution. The solution was purged with nitrogen to remove oxygen sufficiently, and after adding 8.0 g of 2,2'-azobis-2-amidinopropane hydrochloride as a polymerization initiator, polymerization at 28° C. (starting temperature) in an adiabatic state was conducted. The polymerization ended in 180 minutes, and the temperature of the polymer reached 95° C. at maximum due to the heat of polymerization. After the polymerization, the top end plate of the polymerization vessel was removed, and the vessel was turned 180° to remove the polymer entirely. The adhesiveness of the polymer gel to the polymerization vessel at this time was so slight that it could be neglected.

The polymeric gel obtained (40 kg per batch) was passed through an extrusion mincer having a perforated plate with a pore diameter of 3.2 mm at its forward end and a cutter inside the mincer. The resulting cord-like minced gel particles were dried in a rotary cylindrical hot air dryer having a diameter of 470 mm and a width of 560 mm. The drying conditions were as follows: rotating speed of the drying drum: 4.5 rmp; flow rate of hot air at the inlet: 0.6 m/sec.; hot air temperature: 60° C.; and drying time: 300 minutes.

During the drying, the minced polymer gel was in the form of pellets with a diameter of several millimeters which were dried while flowing well in the drying drum. Finally, dried pellets in a substantially cubic form which were extremely easy to handle were obtained.

The dried pellets were pulverized finely using a pulverizer to obtain a powdery polymer. The powdery polymer was soluble in water, and an aqueous solution of the polymer at a concentration of 1% had a viscosity of 4,800 centipoises as determined by a Brookfield viscometer using a No. 2 rotor at a speed of 6 rpm. The powdery polymer had a moisture content of 7.9%.

EXAMPLE 2

Polymerization was carried out under the same conditions as in Example 1 except that polyethylene glycol was not used, and then using the same procedure as in Example 1, cord-like minced gel particles were obtained.

Minced gel particles were spread on a stainless steel wire gauze, and an aqueous solution of polyethylene glycol having a molecular weight of about 6,000 in the varying concentrations as shown in Table 1 below was sprayed onto the minced gel particles in an amount of 2% by weight based on the weight of the cord-like minced gel particles.

40 kg of each of the resulting cord-like minced gel particles was dried under the same conditions as in Example 1 using the same rotary dryer as set forth in Example 1. The results obtained are also given in Table 1.

Table 1

| Concentration of Polyethylene Glycol (% by weight) | Conditions within the Dryer (freedom from adhesion of gel particles to one another)* | Amount of Polyethylene Glycol (% by weight gel) |
|---|---|---|
| 20 | Excellent | 0.4 |
| 10 | Excellent | 0.2 |
| 5 | Good | 0.1 |
| 2 | Fair | 0.04 |
| 1 | Fair | 0.02 |
| 0 | Poor | 0 |

*(Comparison 1)
Excellent:
Hardly any adhesion of the gel particles to one another and to the inside wall of the dryer was observed, and the flowability of the gel particles was excellent. After drying, the gel particles became separate single particles.
Good:
Some adhesion was observed between the gel particles and between the gel particles and the inside wall of the dryer.
Fair:
A fairly high degree of adhesion was observed although the degree of adhesion was betterthan in the case of not employing polyethylene glycol.
Poor:
About 80% by weight of the gel particles within the dryer adhered to one another. Moreover, considerable labor was required to remove the dried gel particles which adhered to the inside wall of the dryer.

EXAMPLE 3

Using a 1.5-liter experimental polymerization vessel, oxygen was removed from a monomer solution (1000 g) of each of the compositions shown in Table 2 sufficiently by purging the system with nitrogen, and after addition of 0.1 g of 2,2'-azobis-2-amidinopropane hydrochloride, polymerization at 30° C. (starting temperature) in an adiabatic state was conducted.

The resulting polymer gel was communicated using a small-sized extrusion mincer having a porous plate with a pore diameter of 4 mm and having a cutter inside the mincer. The minced fragments of the polymer gel were spread on a synthetic resin net in a shelf-type hot air dryer, and dried at 60° C. for 15 hours. The adhesion of gel particles to one another during the period of time from mincing to drying was evaluated.

Table 2

| | Polymerization Run | | | | | | |
|---|---|---|---|---|---|---|---|
| Composition* | Comparison 2 | 1 | 2 | 3 | 4 | 5 | 6 |
| Acrylamide (g) | 218.5 | 218.5 | 218.5 | 218.5 | 218.5 | 218.5 | 218.5 |
| DMAEMA** (g) | 11.5 | 11.5 | 11.5 | 11.5 | 11.5 | 11.5 | 11.5 |
| 96% $H_2SO_4$ (g) | 3.75 | 3.75 | 3.75 | 3.75 | 3.75 | 3.75 | 3.75 |
| Polyethylene Glycol (g) | — | 2.5 | 2.5 | 5.0 | 2.5 | 2.5 | 2.5 |
| Average Molecular weight of Polyethylene Glycol | — | 400 | 1,500 | 1,500 | 6,250 | 20,000 | 1 million |
| Adhesion of Gel | | | | | | | |

Table 2-continued

| | Polymerization Run | | | | | | |
|---|---|---|---|---|---|---|---|
| | Comparison 2 | 1 | 2 | 3 | 4 | 5 | 6 |
| Particles to Particles to One Another | Extremely high | Somewhat high | Slight | Scarcely none | Scarcely none | Scarcely none | Somewhat high |
| Remarks | | | | | | | Viscosity of monomer solution increased |

*The components were dissolved in deionized water so that the resulting solution weighed 1,000g (hereinbelow the same)
**Dimethylaminoethyl methacrylate (hereinbelow the same)

EXAMPLE 4

A monomer solution of each of the composition shown in Table 3 below was polymerized in an adiabatic state using the same polymerization vessel as used in Example 3 under the conditions shown in Table 3 below.

The polymeric gels obtained were each mince and dried in the same way as in Example 3, and adhesion of the gel particles to one another was evaluated in the same way. The results are shown in Table 3.

hydrogels free from flowability. The hydrogels were aged for 16 hours in an adiabatic state.

Then, the hydrogels were minced and dried in the same way as set forth in Example 1. About 20% of the polymer gel particles obtained in the absence of polyethylene glycol adhered to one another and caked. In contrast, hardly any caked portion in the polymer gel particles was obtained in the presence of polyethylene glycol. Both of these polymers were hydrolyzed products of polyacrylamide with a hydrolysis ratio of about 14 mole%.

Table 3

| Composition | Polymerizaton Run | | | | | | |
|---|---|---|---|---|---|---|---|
| | Comparison 3 | 7 | Comparison 4 | 8 | 9 | Comparison 5 | 10 |
| Acrylamide (g) | 220 | 220 | 160 | 160 | 160 | 80 | 80 |
| DMAEMA (g) | — | — | 160 | 160 | 160 | — | — |
| DMMC* (g) | — | — | — | — | — | 320 | 320 |
| 96% $H_2SO_4$ (g) | — | — | 52 | 52 | 52 | — | — |
| Polyethylene Glycol** (g) | — | 2.0 | — | 4.0 | 16.0 | — | 20.0 |
| Polymerization Initiation Temperature (°C) | 30 | 30 | 32 | 32 | 32 | 32 | 32 |
| Amount of Initiator*** (ppm/monomer solution) | 200 | 200 | 100 | 100 | 100 | 250 | 250 |
| Adhesion of Polymeric gel particles to one another | Some | Scarcely none | Very high; crushed gel particles again agglomerated; (many aggregates of dried particles formed) | Somewhat high | Scarcely none | Very high; crushed gel Particles again agglomerated; (many aggregates of dried particles formed) | Scarcely none |
| Viscosity of a 1% Aqueous Solution of Powder Polymer (centipoises) | 2,300 | 2,150 | (formation of powder difficult) | 350 | 400 | (formation of powder difficult) | 8,700 |
| Remarks | Nonionic | | Tertiary Cationic | | | Quaternized Cationic | |

*Methyl chloride quaternary salt of DMAEMA
**Having an average molecular weight of 6.250
***2,2'-Azobis-2-amidinopropane hydrochloride

EXAMPLE 5

23 kg of acrylamide, 0.6 kg of sodium hydroxide and 0.9 kg of boric acid were dissolved in deionized water to form 100 kg of a monomer solution. The solution was divided into two portions each weighing 50 kg. These portions were each placed in an 80-liter polymerization vessel, and 0.23 kg of polyethylene glycol having an average molecular weight of 4,000 was added to one portion. Oxygen was removed sufficiently from both systems by purging with nitrogen, and at 25° C., 2.0 g of potassium persulfate and 2.0 g of dimethylaminopropionitrile were added as polymerization initiators. Both systems exhibited the same polymerization behavior, and began to polymerize in about 10 minutes. In about 90 minutes, the temperature reached 93° C. at a maximum, whereupon the polymerization ended to afford

EXAMPLE 6

The nonionic polyacrylamide shown in Comparison 3 in Table 3 was prepared using a 10-liter stainless steel polymerization vessel on a scale of 6 kg. All of the gel particles obtained were minced employing the same extrusion mincer as used in Example 1 to form a cord-like gel aggregate. One kilogram-portions of the gel aggregate were each placed in a polyethylene bags, and polyethylene glycol (molecular weight about 6,000) in the various amounts shown in Table 4 below was sprinkled in a powdery form onto the aggregates in the bags.

The cord-like gel aggregates, placed in the bags, were allowed to stand for one week, and then, the adhesion of the gel particles to one another was examined. The results obtained are shown in Table 4.

Table 4

| Amount of Polyethylene Glycol Added | Freedom of Adhesion of Gel Particles to One Another* |
|---|---|
| (Weight %) | |
| 5 | Excellent |
| 1 | " |
| 0.5 | " |
| 0.2 | Good |
| 0.02 | Fair |
| — | Poor |

*The adhesion of the gel particles was visually evaluated on the following scale.
Excellent:
No aggregates
Good:
The gel particles were all separated by merely applying a light force from outside the bag.
Fair:
The gel particles were all separated by merely applying a medium force from outside the bag.
Poor:
The gel particles formed a mass with apparently no boundary between the particles.
Note:
The "medium force" and "light force" as used above is not critical but is generally expressed as follows.
Medium force:
Grasping the bag, a pressure of about 5 to about 10kg/cm$^2$.
Light force:
Lightly shaking the bag.

While the invention has been described in detail and with reference to specific embodiments thereof, it will be apparent to one skilled in the art that various changes and modifications can be made therein without departing from the spirit and scope thereof.

What is claimed is:

1. A method for reducing the adhesiveness of a hydrogel of a water-soluble acrylamide polymer or copolymer, which comprises solution polymerizing an aqueous solution consisting essentially of at least about 18% by weight of acrylamide or a monomeric mixture consisting essentially of acrylamide and at least one comonomer selected from the group consisting of dimethylaminoethyl acrylate, dimethylaminoethyl methacrylate, diethylaminoethyl acrylate, diethylaminoethyl methacrylate, dimethylaminohydroxypropyl acrylate, dimethylaminohydroxypropyl methacrylate, dimethylaminoethyl acrylamide, quaternary ammonium salts of these acrylates or methacrylates, acrylonitrile, methacrylonitrile, methyl acrylate, ethyl acrylate, methacrylamide, acrylic acid, methacrylic acid, and alkali metal salts thereof, and from about 0.05 to about 10% by weight, based on the weight of the aqueous solution of the monomer, of polyethylene glycol.

2. The method of claim 1, wherein the polyethylene glycol has an average molecular weight of about 1,000 to about 20,000.

3. The method of claim 1, wherein the amount of the polyethylene glycol ranges from 0.1 to 5% by weight, based on the weight of the aqueous solution of the monomer.

4. The method of claim 1, wherein the acrylamide polymer or copolymer is polyacrylamide, a partially hydrolyzed product of polyacrylamide, or a copolymer derived from acrylamide and another vinyl monomer copolymerizable therewith.

5. A method for reducing the adhesiveness of a hydrogel of a water-soluble acrylamide polymer or copolymer, which comprises applying about 0.05 to 10% by weight, based on the weight of the hydrogel, of polyethylene glycol to the surface of the hydrogel.

6. The method of claim 5, wherein the polyethylene glycol has an average molecular weight of about 1,000 to 20,000.

7. The method of claim 5, wherein the amount of the polyethylene glycol is 0.1 to 5% weight based on the weight of the hydrogel.

8. The method of claim 5, including crushing the hydrogel prior to applying the polyethylene glycol thereto.

9. The method of claim 5, wherein the polyethylene glycol is applied in the form of an aqueous solution thereof.

10. The method of claim 5, wherein the hydrogel polymer is polyacrylamide, a partially hydrolyzed product of polyacrylamide, or a copolymer derived from acrylamide and another vinyl monomer copolymerizable therewith.

11. The method of claim 5, wherein the comonomer is at least one member selected from the group consisting of dimethylaminoethyl acrylate, dimethylaminoethyl methacrylate, diethylaminoethyl acrylate, diethylaminoethyl methacrylate, dimethylaminohydroxypropyl acrylate, dimethylaminohydroxypropyl methacrylate, dimethylaminoethyl acrylamide, quaternary ammonium salts of these acrylates or methacrylates, acrylonitrile, methacrylonitrile, methyl acrylate, ethyl acrylate, methacrylamide, acrylic acid, metharylic acid, and alkali metal salts thereof.

12. The method of claim 1, wherein said acrylamide polymer or copolymer has a molecular weight of at least about 1,000,000.

13. The method of claim 5, wherein said acrylamide polymer or copolymer has a molecular weight of at least about 1,000,000.

* * * * *